United States Patent [19]
Fanning et al.

[11] Patent Number: 5,195,231
[45] Date of Patent: Mar. 23, 1993

[54] METHOD FOR PRODUCING INNER STATORS FOR ELECTROMAGNETIC PUMPS

[75] Inventors: Alan W. Fanning, San Jose; Leslie R. Dahl, Livermore; Mahadeo R. Patel, San Jose; Eugene E. Olich, Aptos, all of Calif.

[73] Assignee: General Electric Company, San Jose, Calif.

[21] Appl. No.: 836,475

[22] Filed: Feb. 18, 1992

[51] Int. Cl.$^5$ .......................................... H02K 15/02
[52] U.S. Cl. ...................................... 29/596; 29/606; 310/11; 310/12
[58] Field of Search ..................... 29/596, 606, 609; 310/11-14

[56] References Cited
U.S. PATENT DOCUMENTS
4,882,514 11/1989 Brynsvold ........................... 310/208

*Primary Examiner*—Carl E. Hall
*Attorney, Agent, or Firm*—Robert R. Schroeder

[57] ABSTRACT

A method for winding stator coils and fabricating laminated iron stator rings, then assembling same into an annular stator column for use in a linear flow electromagnetic induction pump for pumping electrically conductive liquid metal and circulation of same through the coolant circuit of a nuclear fission reactor plant or other liquid metal systems.

10 Claims, 7 Drawing Sheets

Fig. 8

METHOD FOR PRODUCING INNER STATORS FOR ELECTROMAGNETIC PUMPS

FIELD OF THE INVENTION

This invention is concerned with an improvement in annular linear flow electromagnetic induction pumps such as the type commonly used to circulate electrically conducting liquid metal coolant through a liquid metal cooled nuclear fission reactor plant. Such coolant circulating pumps and liquid metal cooled nuclear fission reactors, and their operation or function in this service are disclosed in U.S. Pat. No. 4,508,677, issued Apr. 2, 1985, for example.

BACKGROUND OF THE INVENTION

Annular linear flow electromagnetic induction pumps for impelling liquid metals generally comprise an annular flow channel or duct which is surrounded by a column composed of a multiplicity of alternating annular stator coils and magnetic stator iron. This type of electromagnetic pump, commonly known as a single stator, annular linear flow induction pump, and its use in a liquid metal cooled nuclear fission reactor, is disclosed in U.S. Pat. No. 4,859,885, issued Aug. 22, 1989, and U.S. Pat. No. 4,882,514, issued Nov. 21, 1989.

However a more versatile linear flow electromagnetic induction pump design than those shown in the above patents comprises a double stator system. This electromagnetic pump system comprises the single stator arrangement as shown in the aforesaid patent, which is additionally provided with a second or inner stator arrangement concentrically contained and enclosed within the aforementioned pump central linear liquid flow duct or channel. A second stator column is also composed of a multiplicity of alternating annular stator coils and stator iron. In combination, the outer and inner, or double stators act upon the liquid linearly passing through the annular flow duct.

This double stator arranged pump design provides greater pumping capacity per pump unit size, or alternatively equal capacity provided by a smaller pump unit. Accordingly the double stator pump has the advantages of greater efficiency and versatility, among others.

The disclosures and contents of the aforesaid U.S. Pat. Nos. 4,508,677, 4,859,885 and 4,882,514, are incorporated herein by reference.

SUMMARY OF THE INVENTION

This invention comprises a method for producing the inner stator units of a double stator annular linear flow electromagnetic induction pump suitable for service in a liquid metal cooled nuclear fission reactor plant to circulate the liquid metal coolant through the coolant cycle. The method of this invention comprises steps or means for forming and assembling the components of an inner stator composed of annular stator coils of copper conductor strips, and laminated iron magnetic stator rings.

BRIEF DESCRIPTION OF THE DRAWING

FIG. 6b, 6c, 6d, 6e, 6f and 6g are each perspective views of different mechanical fasteners for the composite iron ring stator unit of FIG. 6a.

DETAILED DESCRIPTION OF THE INVENTION

Figure 1:
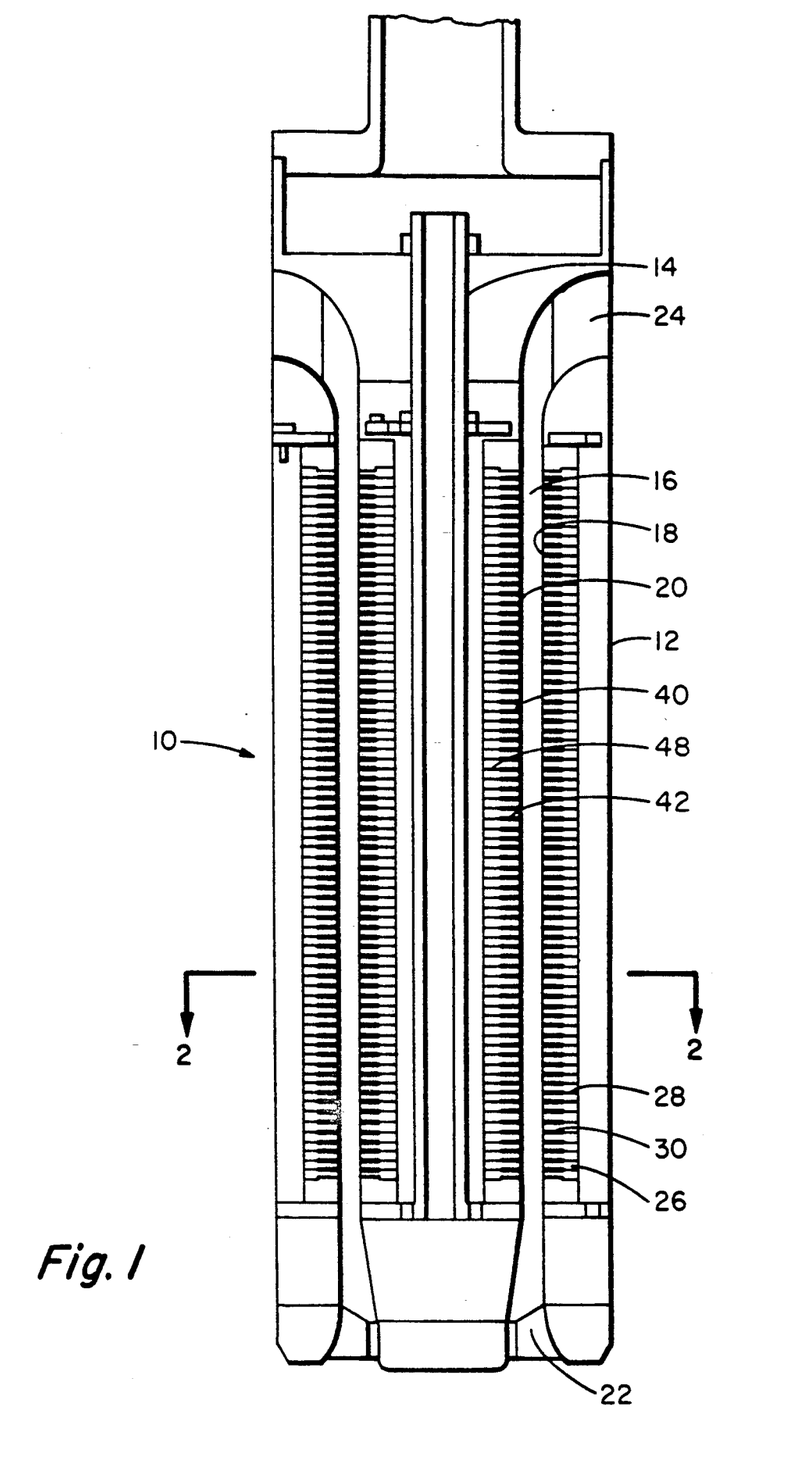
FIG. 1 is a view, part in section, of a double stator annular linear flow electromagnetic pump.
Figure 2:
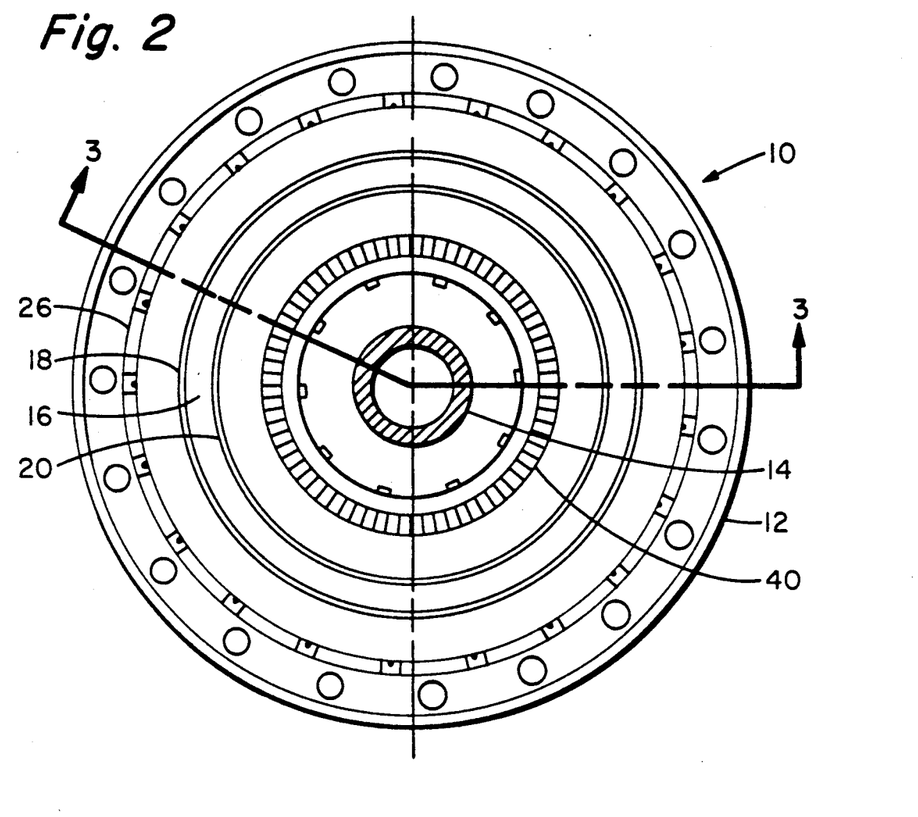
FIG. 2 is a cross-sectional view of the double stator annular linear flow electromagnetic pump of FIG. 1, taken along lines A—A of FIG. 1.
Figure 3:
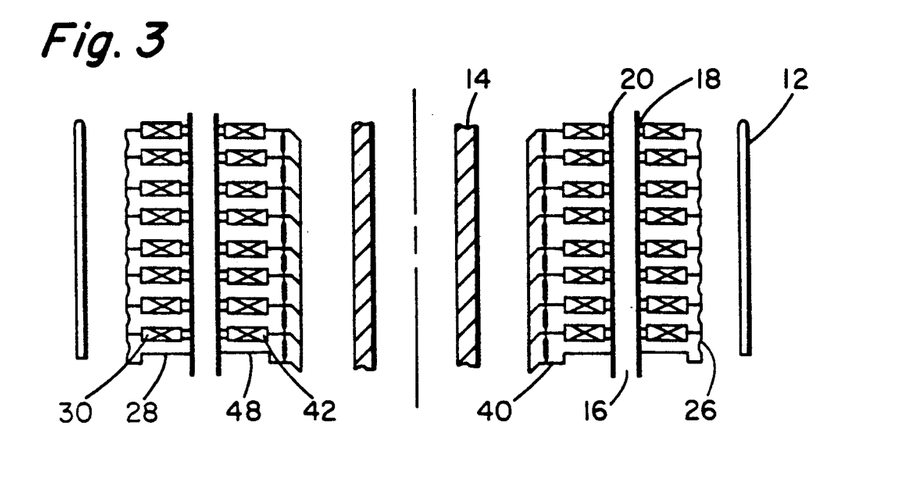
FIG. 3, is a partial cross-sectional view of the double stator assembly of the annular linear flow electromagnetic pump of FIG. 2, taken along line B—B of FIG. 2.

Referring to the drawings, in particular FIG. 1, 2 and 3, a double stator annular linear flow, electromagnetic induction pump 10, for service in electrically conducting liquid systems, typically comprises the following assemblage of components: Pump housing 12, commonly a cylindrical unit, encloses the electromagnetic induction system and provides the necessary protection to enable the pump to operate submerged within the aggressive environment of liquid sodium metal commonly utilized as the coolant medium in liquid metal cooled nuclear fission reactors. The pump assembly inner stator is secured and supported by means of a central support post 14. The double stator electromagnetic pumps 10 which are the subject of this invention contain an annular flow channel 16 for magnetically impelling the passage of liquid metal therethrough. Annular flow channel 16 is defined by an outer flow conduit 18 and concentrically therein arranged, spaced apart smaller inner flow conduit 20. An inlet 22 provides entry to the annular flow channel 16, and outlet 24 provides for discharge therefrom, whereby the induced linear flow of liquid metal through the pump 10 is effected, generally upward from the bottom inlet 22 to the top outlet 24.

The outer stator 26, comprising an annular column positioned between the pump housing 12 and the outer flow conduit 18, circumferencially extends around the outside of conduit 18. Outer stator 26 can be generally conventional in design, comprising a multiplicity of alternately stacked annular stator units consisting of stator magnetic irons 28 and stator coils 30. The stator coils 30 commonly consist of strips or ribbons of copper metal 32 wound upon itself into suitable sized and coiled unit and wrapped in electrical insulation. The coil terminals or power leads extend from the outer periphery of the outer coil 30. The stator magnetic irons 28 commonly consist of thin iron elements or laminations which are aligned side-by-side and laminated into composite units. The iron elements can be laminated into a continuous composite ring, or laminated into a number of individual composite units or packages which in turn are assembled together into a ring configuration.

In a conventional single stator electromagnetic pump as shown in U.S. Pat. No. 4,882,514, the stator iron rings 28 and stator coils 30 are alternately stacked superimposed upon each other forming a column 26 surrounding the annular flow conduit 18 and provides the magnetic impelling linear flow channel. This single column of stator coils and iron rings external to the annular flow duct provides a pulsed liquid metal impelling force.

With a double stator annular linear flow electromagnetic pump to which this invention applies, in addition to the foregoing outer stator column 26 common to the single stator pump design, an inner stator 40 comprises an annular column positioned within the inner flow conduit 20 whereby the annular stator 40 is circumferently located within and surrounded by conduit 20. Inner stator 40, similar to the outer stator 26, typically consists of coils 42 of strips or ribbons of copper metal 44 insulated and wound upon or within itself into suitable sized and coiled units having terminals or leads 46 extending from inside the coil. Similarly the stator iron rings 48 consist of thin iron elements or laminations 50 which are aligned side-by-side and laminated into a continuous composite ring. Inner stator coils 42 and stator iron rings 48 are alternately stacked superimposed upon each other forming an annular column 40 enclosed within and surrounded by the inner flow conduit 20. Coils 42 are insulated from the rings 48.

Although both the outer and inner stators are similarly built up or assembled from comparable components comprising alternately stacking conducting copper coils with insulated magnetic iron rings in an annular column, their remains significantly different circumstances or factors to cope with in their assembly and operation. For example with the outer stator the alignment of succeeding layers of coils and rings is assured by the fact that these annular components are installed around the outside of a cylindrical flow conduit 18. However, concerning the inner stator, the inner flow conduit 20 is external to the inner stator stack or column 40 and the conduit 20 is not installed around the stator unit until after it is assembled and its wiring completed. Thus, alignment of the inner stator components is required.

Additionally heat transfer from the pump stator of a double stator, annular linear flow induction electromagnetic pump to the liquid metal impelled therethrough is substantially dependent upon clearances existing at the stator-to-flow annulus duct interface. Namely, large gaps will reduce heat transfer and result in an increase in stator temperatures whereas smaller gaps will result in the opposite effect.

For outer stators, such as 26 in FIG. 1, the gap at the stator-to-flow conduit 18 interface is minimized by the advantageous condition that typical conduit materials, such as stainless steel, have a high thermal expansion coefficient and typical stator iron materials have a lower thermal expansion coefficient. Thus, as the pump is brought up to operating temperature, flow conduit 18 thermal growth exceeds that of outer stator 26, ensuring a close fit at the interface.

However, regarding the inner stator of double stator induction electromagnetic pumps, the use of the same or similar component materials of construction would result in the reverse situation, that is the flow conduit 20 moving away from the stator iron ring as the pump is brought up to operating temperature. Further complicating the occurrence is the requirement that the outer and inner flow conduits 18 and 20 be made of the same material to avoid significant differential thermal expansion between them whereby the size of the flow channel 16 through the pump would be subject to change. Therefore, there is a decided need to provide an inner stator design that minimizes the gap at the stator iron-to-flow conduit interface at pump operating temperatures.

The inner stator coils 42 of this invention comprise several embodiments having their electrical terminals or leads 46 projecting inward from the coil. Preferably an end of the coil is used to provide a terminal for connection to a power source. Moreover the coils which are conventionally produced by winding strips or ribbons of copper or the like metal can be formed in one or more tiers or layers either by multiple windings or combining two or more tiers, one superimposed upon the other.

Figure 4:
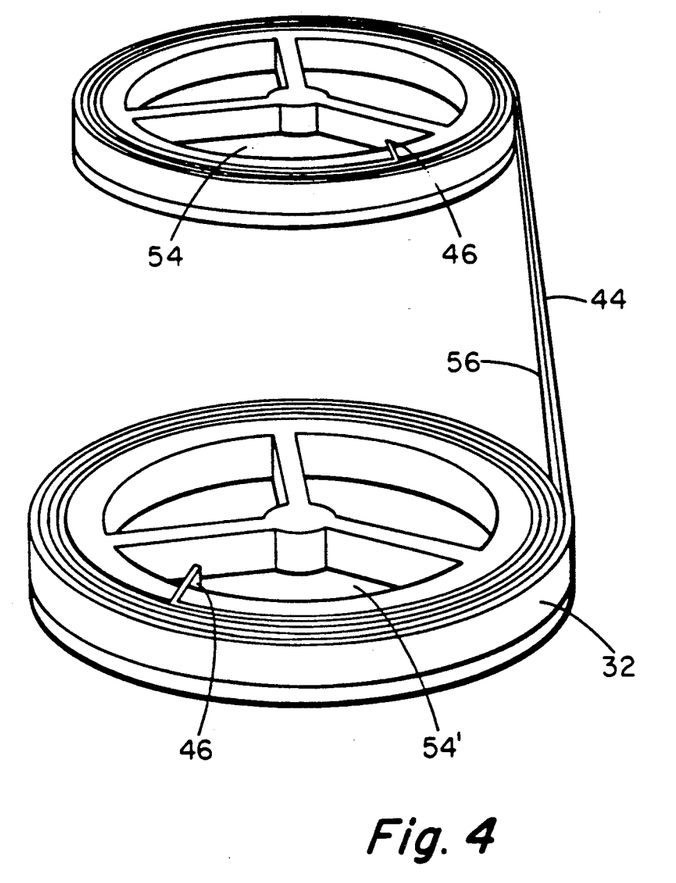
FIG. 4 is a perspective view of coil winding means for producing stator coils.

One means in accordance with this invention, as shown in FIG. 4 comprises starting winding the opposite ends of a strip of copper upon a pair of mandrels 54-54' rotating in opposite directions until all free copper stripping 44 has been wound on the mandrels whereupon the two coiled winding are adjoined by placing one on top of the other. Thus the remaining intermediate copper strip section 56 connecting the two wound coils provides a terminal portion which is located integral within the coils or composite stacked column thereof.

Variations of measures of this invention comprise winding both ends of strip 44 on opposite rotating mandrels 54 as noted above, except that one coil such as the upper tier is wound with an undersized outer diameter. After the shorter upper tier coil is mated with the lower coil tier, a short cylindrical form, of a height and inside diameter equal to that of the finished coil 42, is placed around both coiled tiers. The conductor strips 44 of the upper tier are then encouraged to expand tightly outward against the form and one another by pushing and pulling, as required, on their free ends.

Another alternative means comprises winding the lower tier coil first. A short cylindrical form, of height and inside diameter equal to that of the finished coil, is then placed around this tier. Upon further rotation of the mandrel, the remaining partial or half-length sections of each copper strip are simultaneously fed into the form, creating the upper coil tier as the remaining copper strip is used up.

A variation of the foregoing alternative comprises not integrally connecting the two windings of separate lengths of copper strip. The two tiered windings are then joined with a welded or brazed transition joint rather than a continuous strip.

Unlike the outer stator iron where the iron ring, regardless of whether assembled of discrete composite units or packets of iron elements such as shown in the above U.S. Pat. No. 4,882,514, FIG. 3C for example, is continuous at its inside diameter, the inner stator iron rings 48 must be approximately continuous at their outside diameter. This requirement essentially eliminates the use of discrete composite units or packets of iron elements as heretofore commonly employed in the prior art.

Figure 5A:
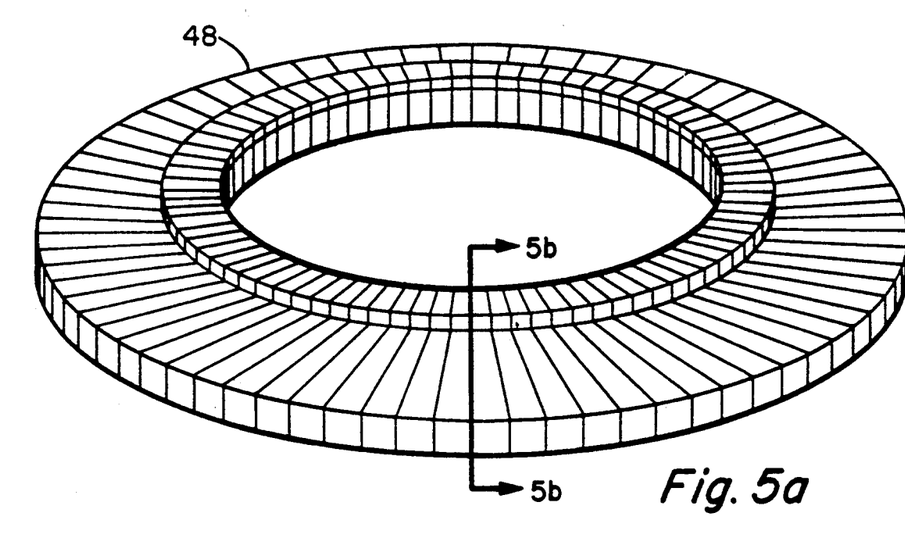
FIG. 5a is a perspective view of a composite iron ring inner stator unit.
Figure 5B:
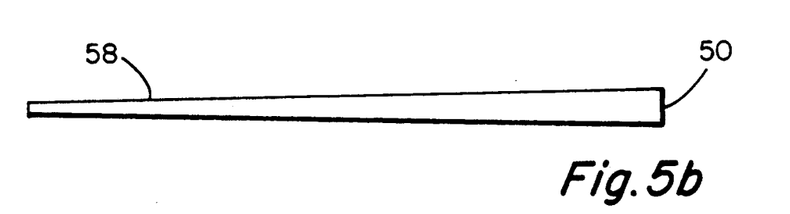
FIG. 5b is a top view of a single iron element component of the composite iron ring stator unit of FIG. 5a, and FIG. 5c is a side view of the same single iron element.
Figure 5C:
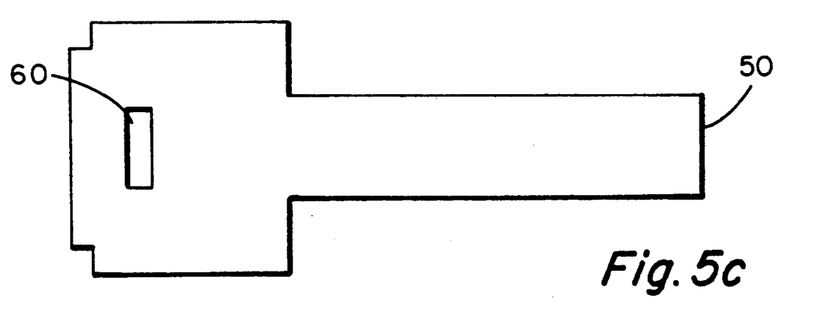

In accordance with this invention, as shown in FIG. 5, an inner stator iron continuous ring is fabricated by joining a multiplicity of iron elements or leafs in an annular configuration or ring by means of the use of a sufficient number of tapered or wedge shaped elements 58, either alone or in combination with flat elements spaced at suitable intervals. The individual elements of the assembled ring are laminated together by suitable bonding means such as a ceramic adhesive or mechanical devices. Apt mechanical means are shown in FIG. 6 and comprise slot perforations 60 passing through each element at a common location with the use of mechanical fasteners such as bolts 62, tabs with bent ends 64, bars 66, tubes 68, pins, etc.

Figure 8:
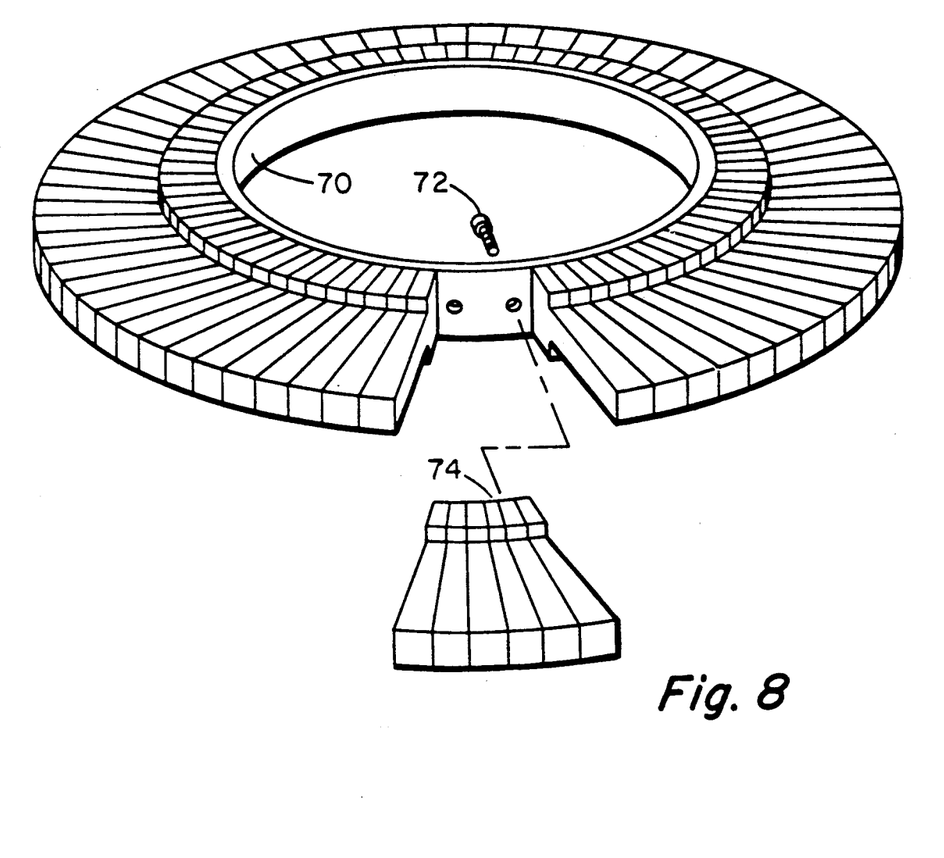
FIG. 8 is a perspective view of a securing arrangement for assembling a composite iron stator ring.

To mitigate against possible damage due to vibrations, it is highly desirable to clamp the stator units. For inner stators 40, this function can be provided by pulling the iron of each lamination unit up against the outside diameter of an inner alignment ring 70. This is accomplished with radially oriented bolts 72 extending from the inside diameter of the alignment ring 70 into tapped holes 74 in the package iron elements. The alignment ring 70 thus becomes an integral part of the inner stator lamination ring assembly.

Figure 6A:
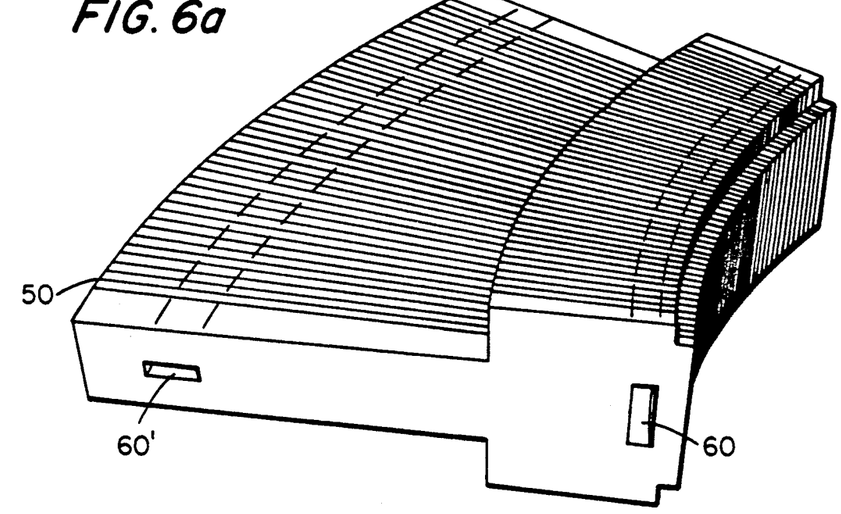
FIG. 6a is a partial view of a section of a modification of a composite iron ring stator unit.
Figure 6B:
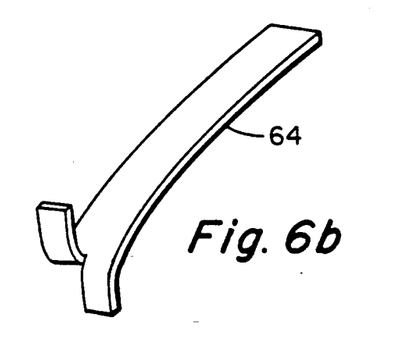
Figure 6C:
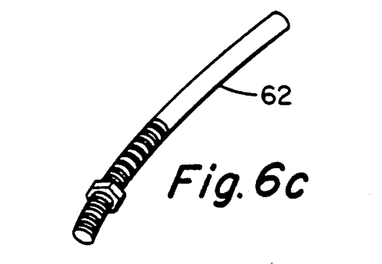
Figure 6D:
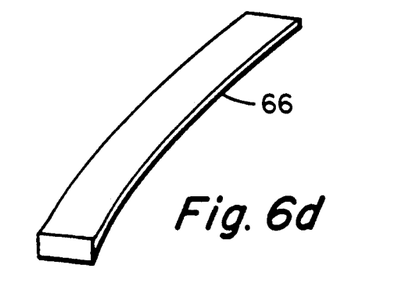
Figure 6E:
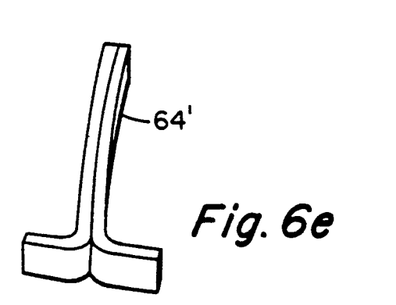
Figure 6F:
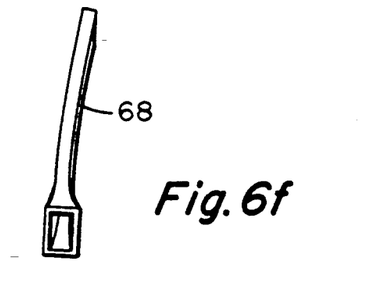
Figure 6G:
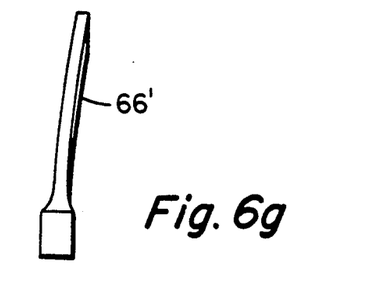
Figure 7:
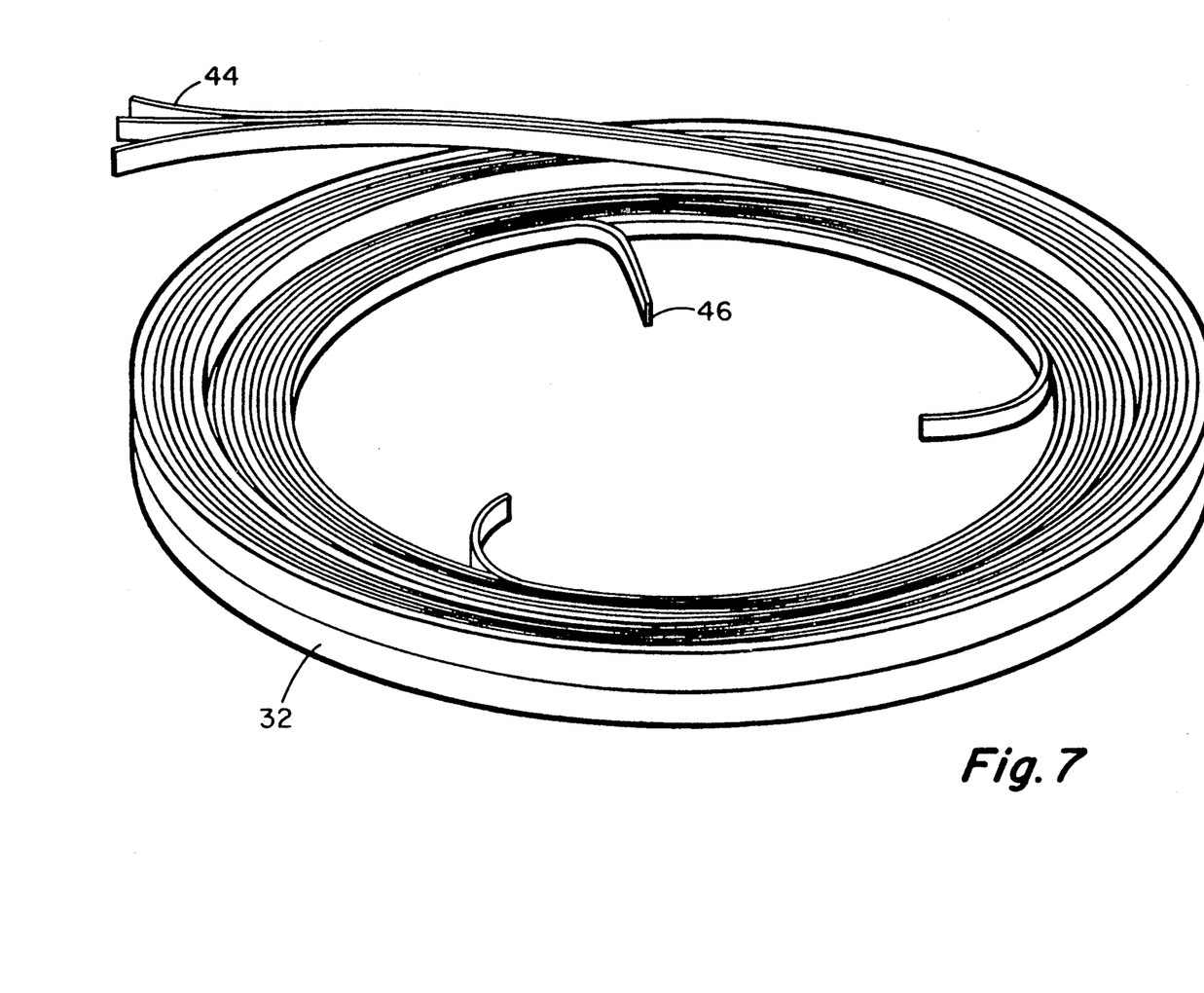
FIG. 7 is a perspective view of a two tier wound coil of copper strips.

For additional security, laminated unit attachment to an alignment ring can be provided with a drilled and tapped bar passing through the unit back iron. Arrangement of this fastener as shown in FIGS. 6e, 6f, and 6g with the narrowest dimension normal to the flux path will assure that it has the minimal effect possible upon pump performance.

To maximize the thermal expansion of the inner stator, the alignment ring is made of a high thermal expansion alloy, such as 304 or 316 stainless steel. Thus, the lamination ring expansion rate is a composite of the alignment ring and the stator iron expansion rates. In combination with higher operating temperatures, the composite expansion rate is sufficient to assure that the inner stator iron will experience comparable thermal growth to the inner flow duct. Thus, the inner stator iron-to-flow duit gap and inner stator temperatures are minimized. Furthermore, with the use of a shrink fit at assembly, the inner flow conduit will function as a significant band clamp for the complete inner stator.

What is claimed is:

1. A method of producing the inner stator units of a double stator annular linear electromagnetic pump for service in an electrically conducting liquid metal including the steps for assembling an inner stator composed of alternating units of annular stator coils and laminated iron stator rings, comprising the combination of steps of:

forming the stator coil units by winding strips of insulated copper upon a mandrel while leaving at least two strip portions projecting inward from inside the formed coil as terminals;

assembling iron stator ring units composed of a multiplicity of thin iron elements laminated together forming a composite iron ring; and alternately stacking a multiplicity of said wound stator coils and said rings of laminated iron in an annular column providing a composite inner stator for installation within an inner stator duct of a double stator annular linear electromagnetic pump for service in a liquid metal system.

2. The method of producing the inner stator units of a double stator annular linear electromagnetic pump for service in a liquid metal of claim 1 wherein the assembled annular units composed of a multiplicity of thin iron elements laminated together forming a composite iron ring includes tapered iron elements.

3. The method of producing the inner stator units of a double stator annular linear electromagnetic pump for service in a liquid metal system of claim wherein the assembled annular units composed of a multiplicity of thin iron elements laminated together forming a composite iron ring are bonded together in the ring by means of a ceramic adhesive.

4. The method of producing the inner stator units of a double stator annular linear electromagnetic pump for service in a liquid metal system of claim 1 wherein the thin iron elements of the assembled annular units composed of a multiplicity of thin iron elements laminated together forming a composite iron ring are each provided with a slot perforation and are held together in the ring by means of mechanical fasteners passing through the slot perforations.

5. A method of producing the inner stator units of a double stator annular linear electromagnetic pump for service in an electrically conducting liquid metal including the steps of assembling an inner stator composed of alternating units of annular stator coils and laminated iron stator rings, comprising the combination of steps of:

forming the stator coils having an upper and lower tier by winding the opposite ends of at least one strip of copper upon a pair of mandrels, adjoining the two tiers of strip windings by superimposing the upper tier winding upon the lower tier winding to provide a composite two tier coil of copper strips;

assembling iron stator ring units composed of a multiplicity of thin iron elements laminated together forming a composite iron ring; and alternately stacking a multiplicity of said two tier wound stator coils and said rings of laminated iron in an annular column providing a composite inner stator for installation within an inner stator duct of a double stator annular linear flow electromagnetic pump for service in a liquid metal system.

6. The method of producing the inner stator units of a double stator annular linear electromagnetic pump for service in a liquid metal system of claim 5 wherein the assembled annular units are composed of a multiplicity of thin iron elements laminated together forming a composite iron ring including tapered iron elements.

7. The method of producing the inner stator units of a double stator annular linear electromagnetic pump for service in a liquid metal system of claim 5 wherein the assembled annular units composed of a multiplicity of thin iron elements laminated together forming a composite iron ring are bonded together in the ring by means of a ceramic adhesive.

8. The method of producing the inner stator units of a double stator annular linear electromagnetic pump for service in a liquid metal system of claim 5 wherein the thin iron elements of the assembled annular units composed of a multiplicity of the thin iron elements laminated together forming a composite iron ring are each provided with a slot perforation and are held together in the ring by means of mechanical fasteners passing through the slot perforations.

9. The method of producing the inner stator units of a double stator annular linear electromagnetic pump for service in a liquid metal system of claim 5 wherein the assembled annular units composed of a multiplicity of thin iron elements laminated together forming a composite iron ring surrounding are affixed to an iron securing band.

10. A method of producing the inner stator units of a double stator annular linear flow electromagnetic pump for service in an electrically conducting liquid metal including the steps of assembling an inner stator composed of alternating units of annular stator coils and laminated iron stator rings, comprising the combination of steps of:

forming the stator coils having multiple tiers by winding the opposite ends of at least one strip of copper upon mandrels, adjoining the strip windings by concentrically stacking the copper strip winding to provide a composite coil of copper strips;

assembling iron stator ring units composed of a multiplicity of thin iron leaf elements abutting side-by-side and thus laminated together forming a composite iron ring provided with a surrounding circumferential clamping band; and alternately stacking a multiplicity of said composite stator coils and rings of laminated iron in an annular column providing a composite inner stator for installation within an inner stator duct of a double stator annular linear flow electromagnetic pump for service in a liquid metal system to circulate the liquid metal therethrough.

* * * * *

UNITED STATES PATENT AND TRADEMARK OFFICE
CERTIFICATE OF CORRECTION

PATENT NO. : 5,195,231
DATED : March 23, 1993
INVENTOR(S) : Fanning et al.

It is certified that error appears in the above-identified patent and that said Letters Patent is hereby corrected as shown below:

```
Column 1, line 68, change "A-A" to --2-2--.
Column 2, line 3, change "B-B" to --3-3--.
Column 3, line 28, change "their" to --there--.
Column 4, line 19, change "winding" to --windings--;
          line 29, change "tier coil" to --coil tier--;
          line 37, change "tier coil" to --coil tier--.
Column 5, line 30, change "duct." to --conduit.--;
          line 31, change "duit" to --conduit--;
          line 64, insert --1-- after "claim".
Column 6, line 60, change "surrounding" to --surround and--
                   and insert --alloy-- after "iron".
```

Signed and Sealed this

Twentieth Day of September, 1994

Attest:

BRUCE LEHMAN

*Attesting Officer*     *Commissioner of Patents and Trademarks*